(12) United States Patent
Urano

(10) Patent No.: US 7,033,505 B2
(45) Date of Patent: Apr. 25, 2006

(54) PACKINGS FOR LIQUID CHROMATOGRAPHY, PROCESS FOR PREPARING AND USAGE

(75) Inventor: Takeshi Urano, Osaka (JP)

(73) Assignee: Daiso Co., Ltd, Osaka (JP)

( * ) Notice: Subject to any disclaimer, the term of this patent is extended or adjusted under 35 U.S.C. 154(b) by 186 days.

(21) Appl. No.: 10/779,656

(22) Filed: Feb. 18, 2004

(65) Prior Publication Data

US 2004/0159611 A1 Aug. 19, 2004

(30) Foreign Application Priority Data

Feb. 18, 2003 (JP) .............................. 2003-039244

(51) Int. Cl.
*B01D 15/08* (2006.01)
(52) U.S. Cl. .................. 210/656; 210/635; 210/198.2; 210/502.1
(58) Field of Classification Search ................ 210/635, 210/656, 659, 198.2, 502.1; 502/401, 439
See application file for complete search history.

(56) References Cited

U.S. PATENT DOCUMENTS

| | | | |
|---|---|---|---|
| 4,515,932 A * | 5/1985 | Chung | 528/16 |
| 5,013,577 A * | 5/1991 | Wright et al. | 427/503 |
| 5,103,000 A * | 4/1992 | Akiyama et al. | 544/69 |
| 5,134,110 A | 7/1992 | Sudo et al. | |
| 5,869,724 A * | 2/1999 | Kirkland et al. | 556/410 |
| 2002/0032122 A1 | 3/2002 | Sakai et al. | |
| 2004/0236056 A1* | 11/2004 | Schindler et al. | 528/38 |

FOREIGN PATENT DOCUMENTS

| | | |
|---|---|---|
| EP | 0 443 860 A2 | 8/1991 |
| EP | 0 579 102 A1 | 1/1994 |
| JP | 04-212058 A1 | 8/1992 |
| JP | 08-304371 A1 | 11/1996 |
| JP | 08-310809 A1 | 11/1996 |
| JP | 10-073579 A1 | 3/1998 |

OTHER PUBLICATIONS

EPO Search Report mailed on Aug. 30, 2004.
Yoshihisa Sudo, "End-capping of octadecylsilylated silica gels by high-temperature silylation", Journal of Chromatography A. Elsevier Science, NL, vol. 737, No. 2, Jun. 21, 1996, pp. 139-147, XP004038984, ISSN: 0021-9673.
Yoshihisa Sudo, "Optimization of end-cappng of octadecylsilylated silica gels by high-temperature silylation", Journal of Chromatography A, Elsevier Science, NL, vol. 757, No. 1, Jan. 3, 1997, pp. 21-28, XP00401721, ISSN: 0021-9673.

* cited by examiner

*Primary Examiner*—Ernest G. Therkorn
(74) *Attorney, Agent, or Firm*—Rader, Fishman & Grauer PLLC

(57) ABSTRACT

The present invention provides packings for high performance liquid chromatography whose residual silanol groups are extremely reduced and which remarkably prevent tailing of basic compounds. Endcapping agents represented by the following general formula [II] are reacted in liquid phases or gas phases with silica gel which is surface-modified with chemical modifying agents to link the endcapping agents to the residual silanol groups on the silica gel surface. In the formula, $R^3$ and $R^4$, the same or different, are alkyl having one to four carbon atoms, and n is the factor of structural unit and an integer of 2 to 10.

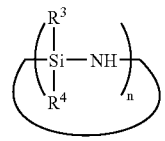

[II]

3 Claims, 7 Drawing Sheets ppm from TMS

Retention time (min.)

ppm from TMS

Retention time (min.)

ppm from TMS

Retention time (min.)

ppm from TMS

Retention time (min.)

ppm from TMS

Retention time (min.)

Retention time (min.)

Retention time (min.)

PACKINGS FOR LIQUID CHROMATOGRAPHY, PROCESS FOR PREPARING AND USAGE

BACKGROUND OF THE INVENTION (a) Field of the Invention

The present invention relates to a novel process for preparing packings for liquid chromatography.

Liquid chromatography is widely used as an important means of analysis and separation in fields of pharmaceuticals, foods, natural compounds and the like. Widely-used packings for liquid chromatography are porous silica gel which is surface-modified with alkyl or the like. The most general silica gel surface-modified is that octadecyl (ODS) is introduced onto OH groups on the surface through siloxane bond, and silica gel bonded with octyl, butyl, methyl groups and the like are also known. The alkyl sometimes has functional group(s) such as phenyl, amino and cyano at its terminal.

However, even if the surface of the silica gel is modified by alkylation, some silanol groups (Si—OH) still remain on the silica surface. The residual silanol group causes the problems that when a basic compound is an object of analysis or preparative separation, the compound is not eluted because of strong interaction between the silanol group and the compound, and tailing of peaks is observed. For the purpose of preventing these phenomena, it is necessary to endcap the residual silanol groups by secondary silylation after surface modification to make the silica surface more inactive.

(b) Description of the Prior Art

Conventional endcapping methods are as follows. Japanese Laid-open Patent Publication No. 212058/1992 describes a method of reacting specified cyclosiloxane, hydrodienesiloxane, alkoxysilane or siloxane as an endcapping agent in a gas phase with silica gel or porous glass which is surface-modified with chemical modifying agents to link the endcapping agent to residual silanol groups on the silica gel surface. Japanese Laid-open Patent Publication No. 304371/1996 describes a method of reacting specified polydimethylsiloxane, polyphenylmethylsiloxane, polydiphenyldimethylsiloxane, polycyanopropylmethyldimethylsiloxane, polycyanopropylmethylphenylmethylsiloxane and the like with silica gel. Japanese Laid-open Patent Publication No. 73579/1998 describes a method of reacting at least two of endcapping agents such as specified silazane, disilazane, siloxane and polysiloxane at 180° to 240° C. in a gas phase with silica gel which is surface-modified with chemical modifying agents.

In these conventional methods, however, the reactions require high temperatures, and the residual silanol groups on the silica surface cannot be sufficiently reduced. Accordingly, packings obtained by these methods cannot prevent tailing of the basic compounds.

In view of the above-mentioned background, an aim of the present invention is to provide packings for high performance liquid chromatography whose residual silanol groups are remarkably reduced and which remarkably prevent the tailing of the basic compounds.

SUMMARY OF THE INVENTION

After intensive studying in order to solve the above-mentioned problems, the present inventor found a process for preparing packings for liquid chromatography wherein endcapping reactions are performed using specified compounds under specified conditions.

Namely, the process for preparing the packings for liquid chromatography according to the present invention is characterized in that endcapping agents represented by the following general formula [II] are reacted in liquid phases or gas phases with silica gel which is surface-modified with chemical modifying agents to link the endcapping agents to residual silanol groups on the silica gel surface.

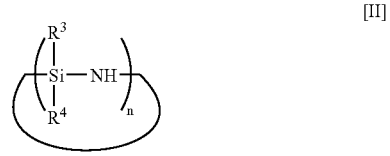

[II]

In the formula, $R^3$ and $R^4$, the same or different, are alkyl having one to four carbon atoms, and n is the factor of structural unit and an integer of 2 to 10.

The above-mentioned chemical modifying agent is preferably alkylsilane represented by the following general formula [I]. However, the chemical modifying agent is not limited to the alkylsilane [I].

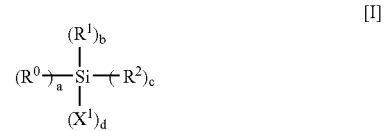

[I]

In the formula, $X^1$ is hydrogen, halogen or alkoxyl having one to four carbon atoms, and $R^0$, $R^1$ and $R^2$, the same or different, are alkyl or aryl. "a" is the factor of $R^0$ and an integer of 0 to 3, "b" is the factor of $R^1$ and an integer of 0 to 3, "c" is the factor of $R^2$ and an integer of 0 to 3, "d" is the factor of $X^1$ and an integer of 1 to 3, and these have a relation: a+b+c+d=4.

The chemical modifying agent represented by the general formula [I] is monofunctional, bifunctional or trifunctional alkylsilane or arylsilane having hydrogen, halogen or alkoxyl. Specific examples of chemical modifying agents are exemplified in Table 1.

TABLE 1

| $R^0$, $R^1$ or $R^2$ Symbol | Monofunctional alkylating agent | Bifunctional alkylating agent | Trifunctional alkylating agent |
|---|---|---|---|
| C30 | Triacontyldimethylchlorosilane<br>Triacontyldimethylmethoxysilane | Triacontylmethyldichlorosilane<br>Triacontylmethyldimethoxysilane | Triacontyltrichlorosilane<br>Triacontyltrimethoxysilane |
| C22 | Docosyldimethylchlorosilane<br>Docosyldimethylmethoxysilane | Docosylmethyldichlorosilane<br>Docosylmethyldimethoxysilane | Docosyltrichlorosilane<br>Docosyltrimethoxysilane |
| C18 | Octadecyldimethylchlorosilane<br>Octadecyldimethylmethoxysilane | Octadecylmethyldichlorosilane<br>Octadecylmethyldimethoxysilane | Octadecyltrichlorosilane<br>Octadecyltrimethoxysilane |
| C8 | Octyldimethylchlorosilane<br>Octyldimethylmethoxysilane | Octylmethyldichlorosilane<br>Octylmethyldimethoxysilane | Octyltrichlorosilane<br>Octyltrimethoxysilane |
| C4 | Butyldimethylchlorosilane<br>Butyldimethylmethoxysilane | Butylmethyldichlorosilane<br>Butylmethyldimethoxysilane | Butyltrichlorosilane<br>Butyltrimethoxysilane |
| C1 | Trimethylchlorosilane<br>Trimethylmethoxysilane | Dimethyldichlorosilane<br>Dimethyldimethoxysilane | Methyltrichlorosilane<br>Methyltrimethoxysilane |
| Ph | Phenyldimethylchlorosilane<br>Phenyldimethylmethoxysilane | Phenylmethyldichlorosilane<br>Phenylmethyldimethoxysilane | Phenyltrichlorosilane<br>Phenyltrimethoxysilane |
| $NH_2$ | 3-Aminopropyldimethylmethoxysilane<br>3-Aminopropyldimethylethoxysilane | 3-Aminopropylmethyldimethoxysilane<br>3-Aminopropylmethyldiethoxysilane | 3-Aminopropyltrimethoxysilane<br>3-Aminopropyltriethoxysilane |
| CN | 3-Cyanopropyldimethylchlorosilane<br>3-Cyanopropyldimethylmethoxysilane | 3-Cyanopropylmethyldichlorosilane<br>3-Cyanopropylmethyldimethoxysilane | 3-Cyanopropyltrichlorosilane<br>3-Cyanopropyltrimethoxysilane |

Figure 1:
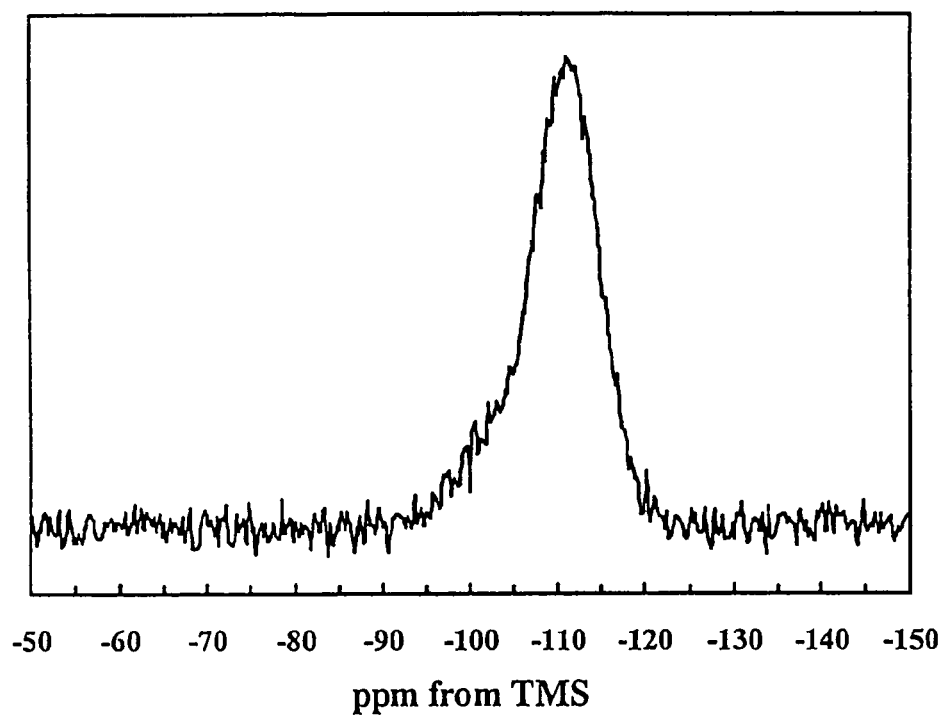
FIG. 1 is the $^{29}$Si-NMR chart of the packing for liquid chromatography obtained in Example 1.
Figure 2:
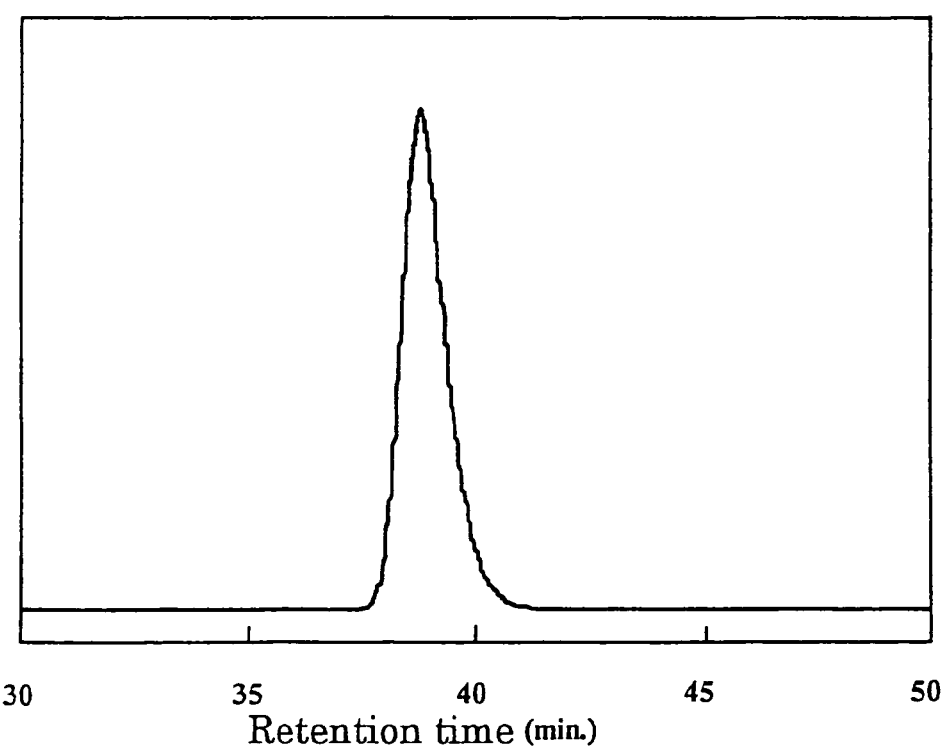
FIG. 2 is the liquid chromatography chart of amitriptyline using the packing for liquid chromatography obtained in Example 1.
Figure 3:
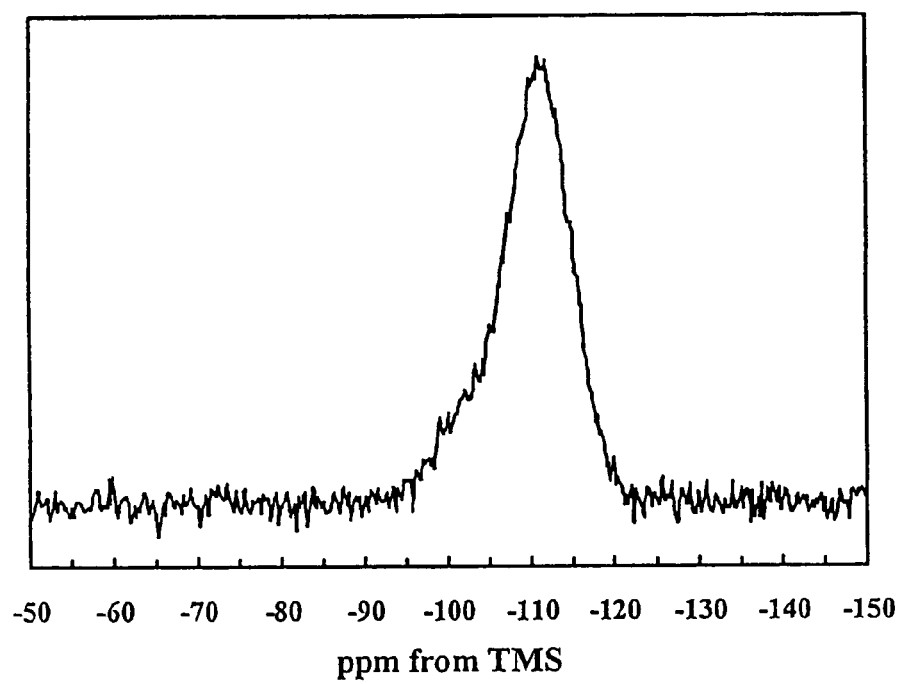
FIG. 3 is the $^{29}$Si-NMR chart of the packing for liquid chromatography obtained in Example 2.
Figure 4:
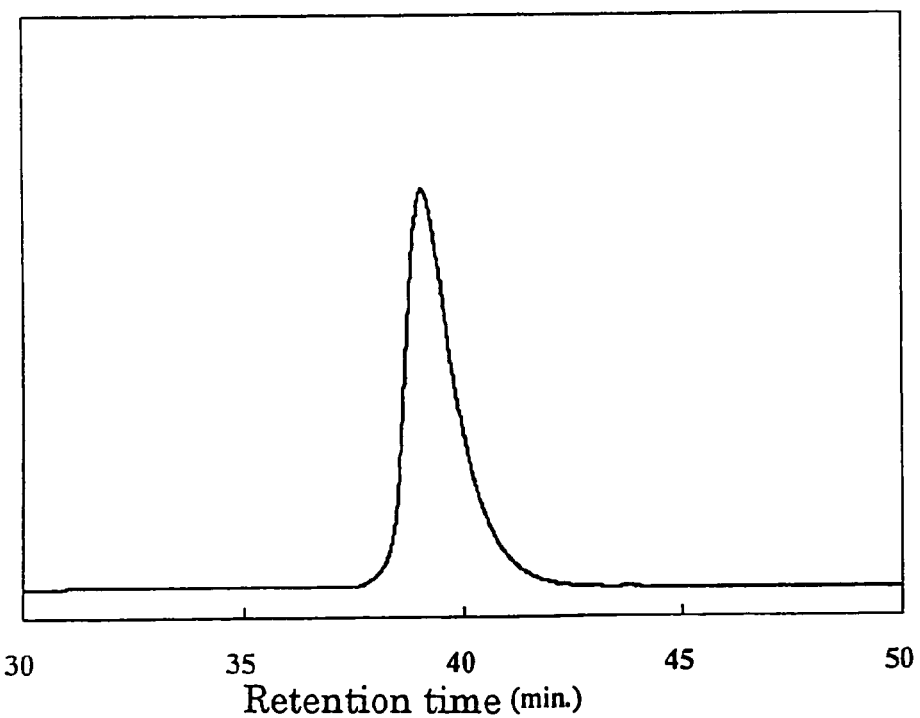
FIG. 4 is the liquid chromatography chart of amitriptyline using the packing for liquid chromatography obtained in Example 2.
Figure 5:
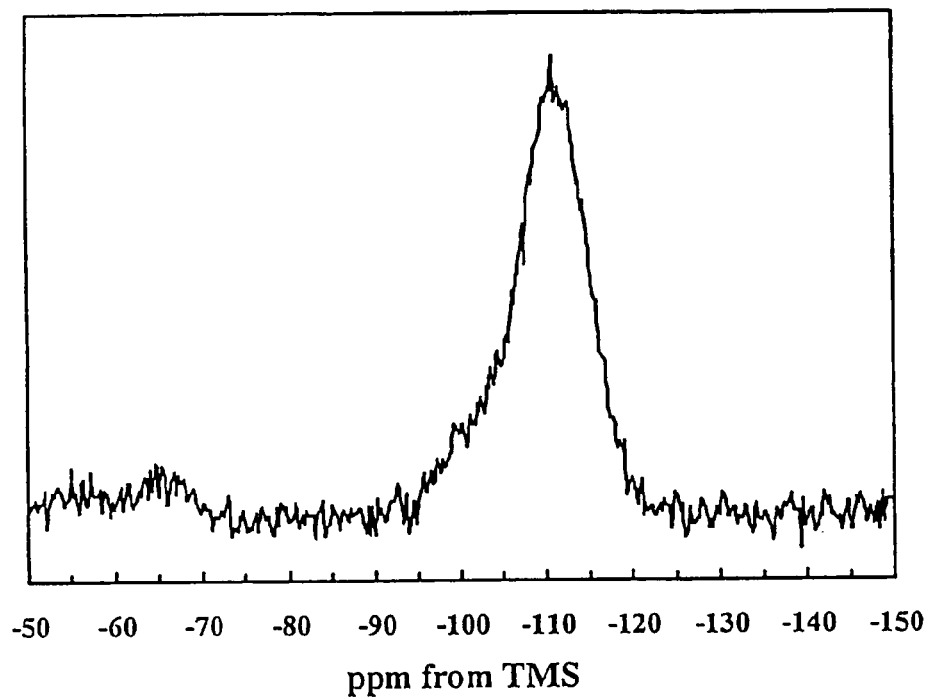
FIG. 5 is the $^{29}$Si-NMR chart of the packing for liquid chromatography obtained in Example 3.
Figure 6:
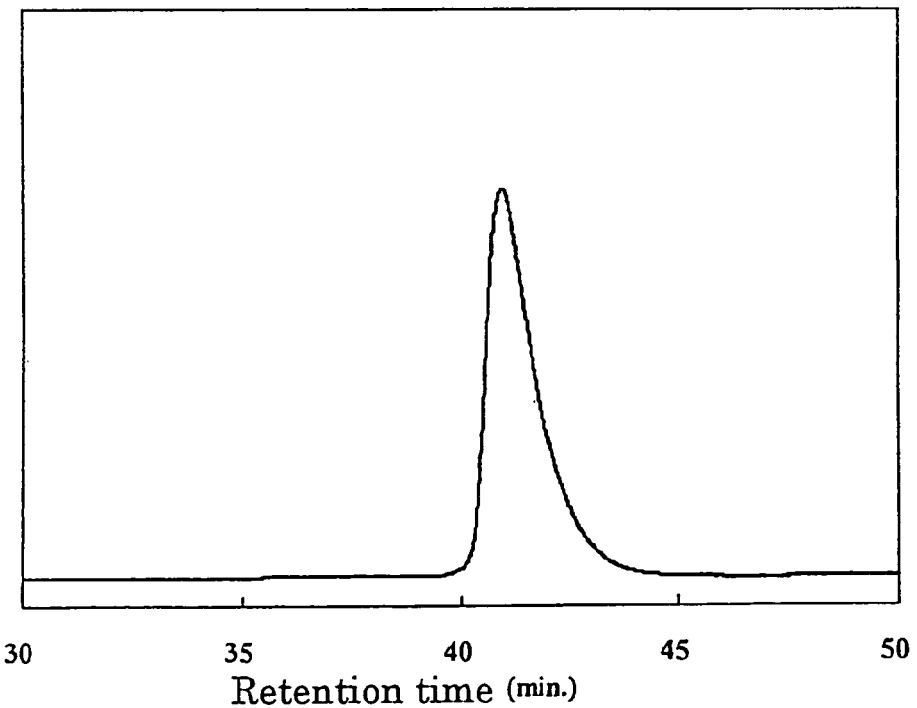
FIG. 6 is the liquid chromatography chart of amitriptyline using the packing for liquid chromatography obtained in Example 3.
Figure 7:
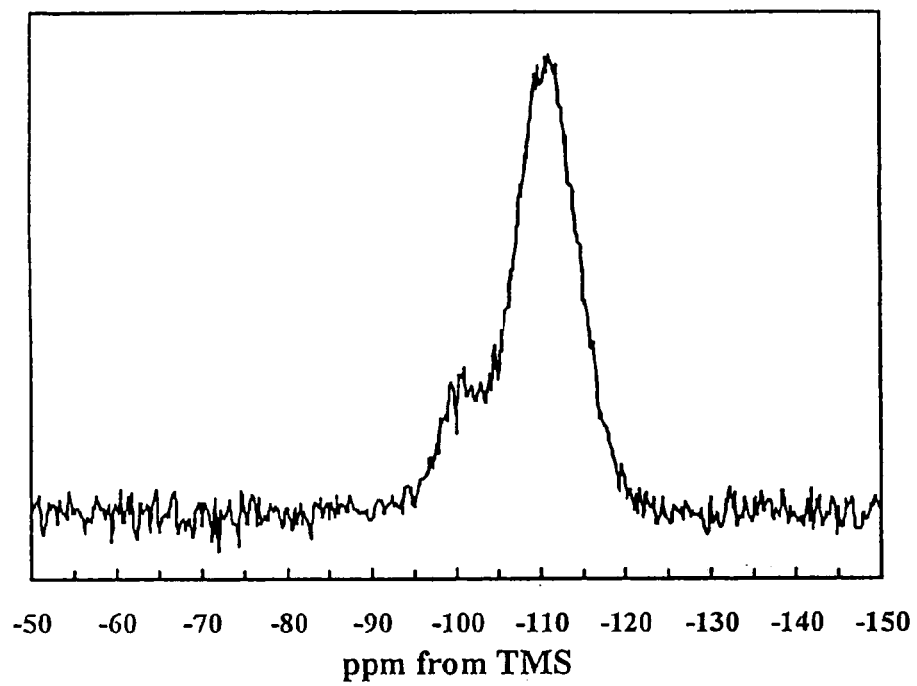
FIG. 7 is the $^{29}$Si-NMR chart of the packing for liquid chromatography obtained in Comparative Example 1.
Figure 8:
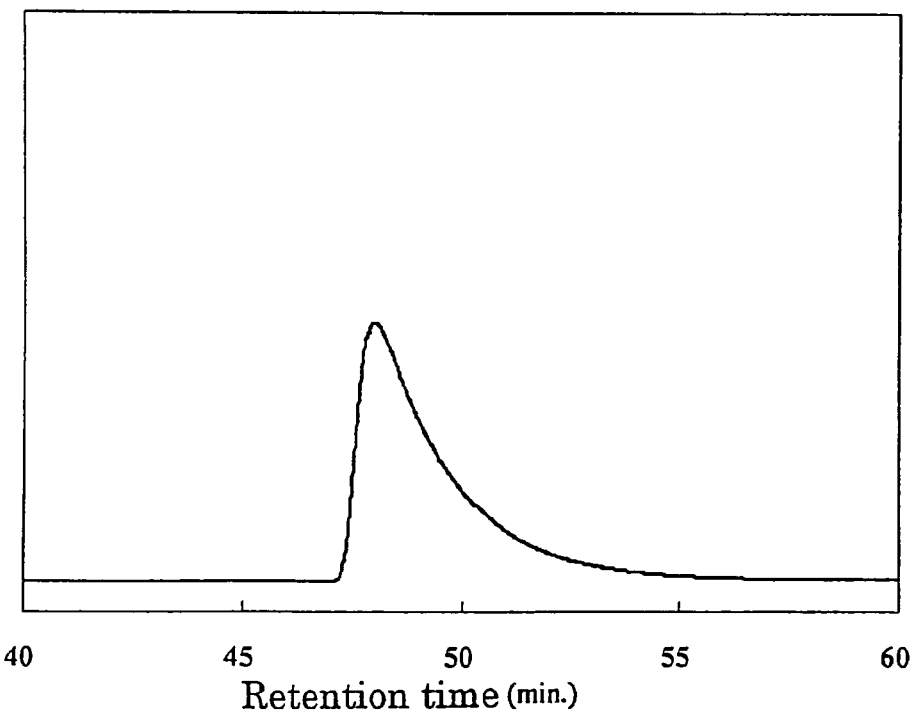
FIG. 8 is the liquid chromatography chart of amitriptyline using the packing for liquid chromatography obtained in Comparative Example 1.
Figure 9:
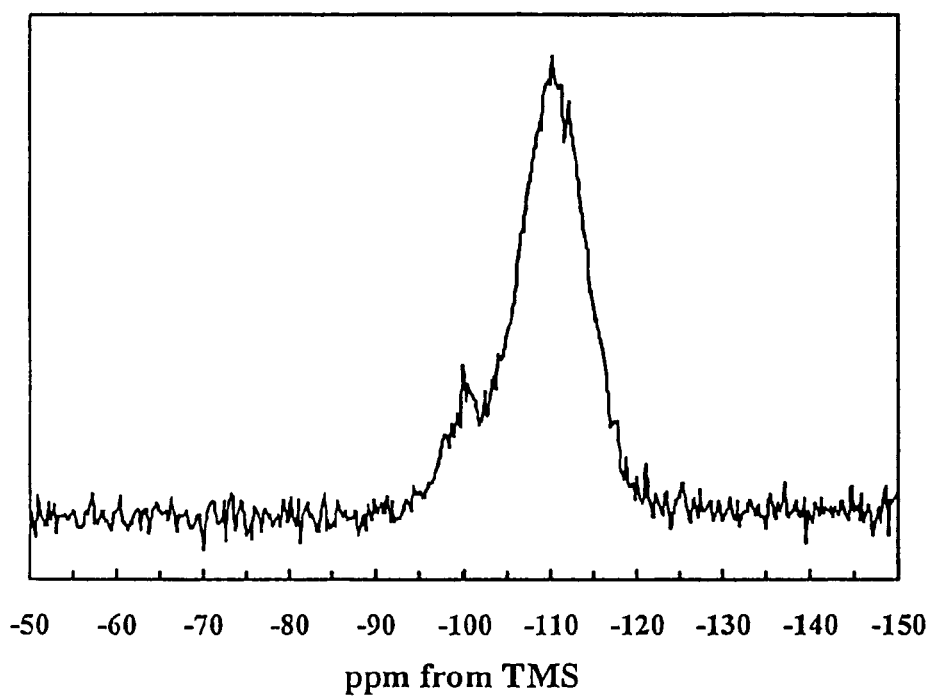
FIG. 9 is the $^{29}$Si-NMR chart of the packing for liquid chromatography obtained in Comparative Example 2.
Figure 10:
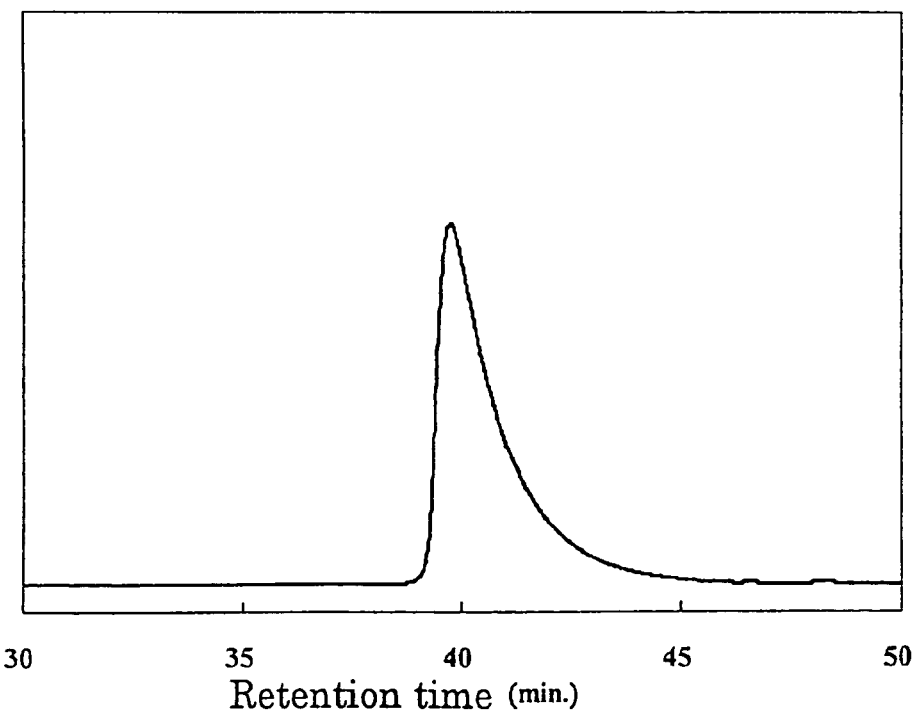
FIG. 10 is the liquid chromatography chart of amitriptyline using the packing for liquid chromatography obtained in Comparative Example 2.
Figure 11:
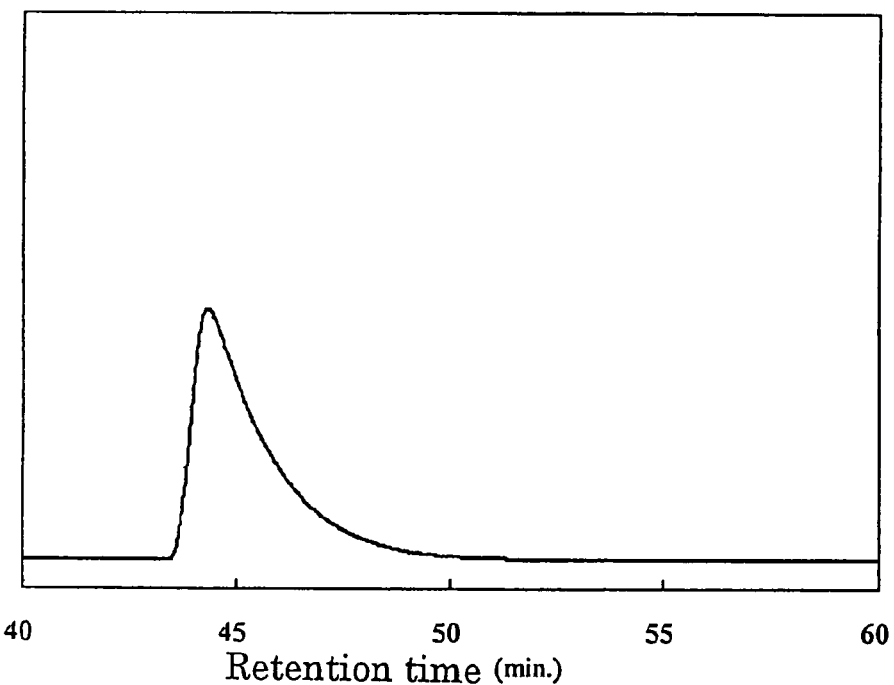
FIG. 11 is the liquid chromatography chart of amitriptyline using the ODS column I produced by G in Comparative Example 3.
Figure 12:
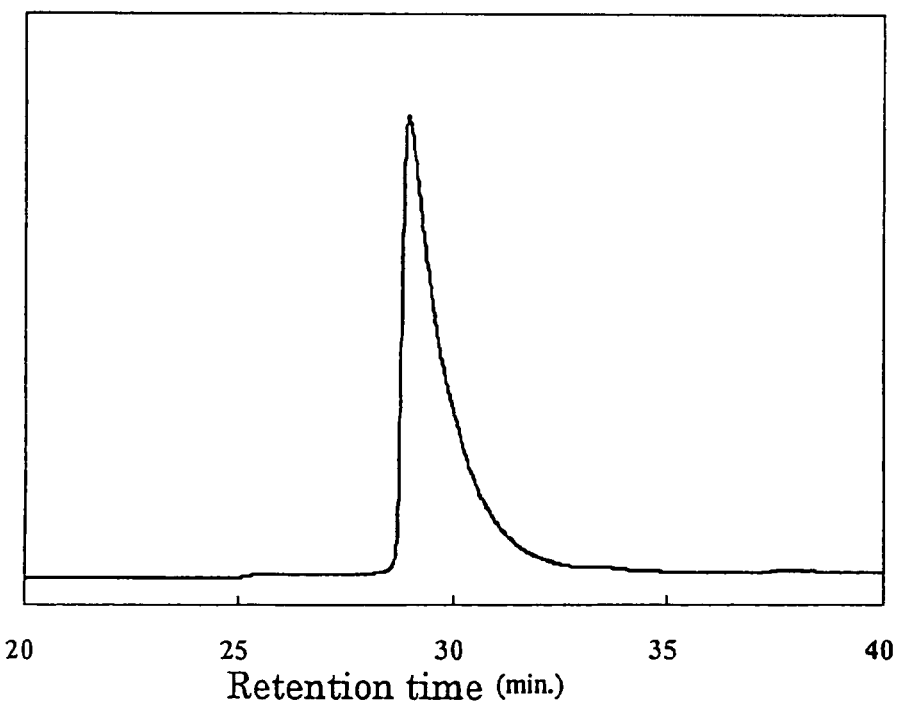

FIG. 12 is the liquid chromatography chart of amitriptyline using the ODS column P produced by Y in Comparative Example 4.

Figure 13:
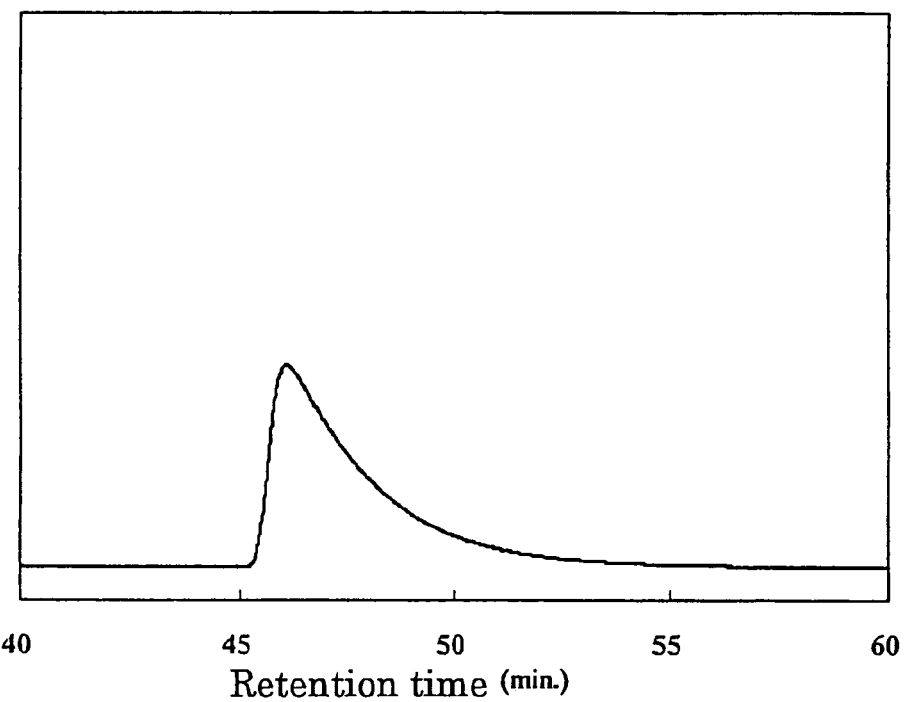

FIG. 13 is the liquid chromatography chart of amitriptyline using the ODS column M produced by N in Comparative Example 5.

Figure 14:
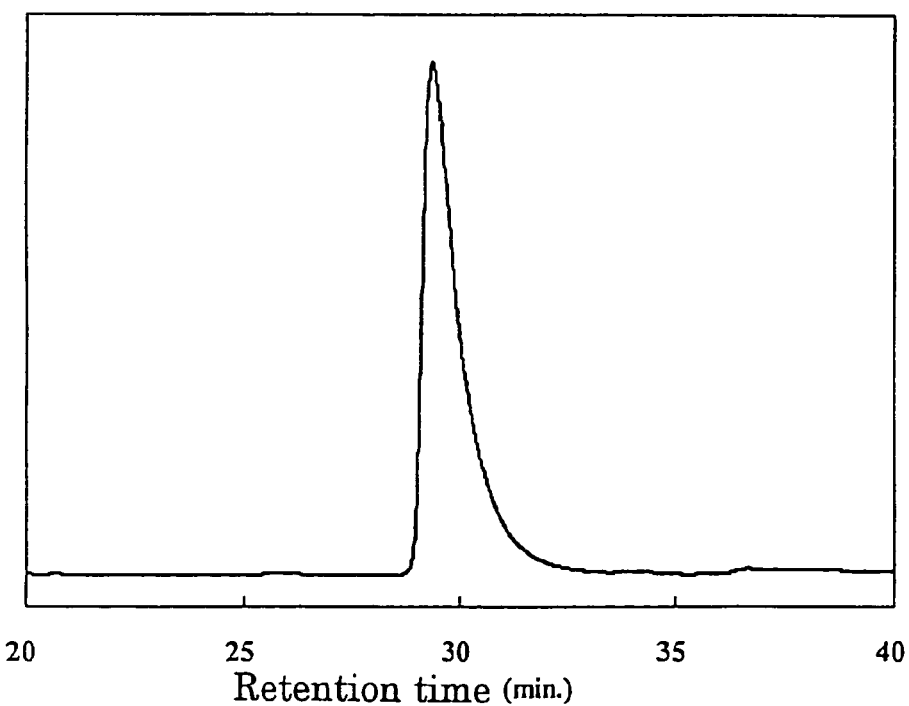

FIG. 14 is the liquid chromatography chart of amitriptyline using the ODS column C produced by S in Comparative Example 6.

DETAILED DESCRIPTION

The alkyl can be straight-chain, branched or alicyclic in the present specification and claims.

The alkyl as $R^0$, $R^1$ and $R^2$ in the general formula [I] has preferably one to 50, more preferably one to 30 carbon atoms. This alkyl can have aryl, amino or cyano at its terminal portion or can have amide (—NH—C(O)—), carbamate (—O—C(O)—NH—), carbamide (—NH—C(O)—NH—), ester (—O—C(O)—) or carbonate (—O—C(O)—O—) at its non-terminal portion.

The aryl as $R^0$, $R^1$ and $R^2$ in the general formula [I] can be phenyl, tolyl, naphthyl or the like.

The packings for liquid chromatography prepared by the above-mentioned process have very small amount (preferably 5% or less) of silanol group residue determined by $^{29}Si$ solid-state NMR. Columns for liquid chromatography packed with the packings for liquid chromatography are particularly suitable for reversed phase liquid chromatography and are useful for analysis and preparative separation of compounds, particularly basic compounds.

Silica gel as a raw material is porous silica gel having a particle diameter of usually 1 to 1,000 μm, preferably 2 to 200 μm, a pore diameter of usually 10 to 10,000 angstrom, preferably 50 to 3,000 angstrom and a surface area of usually 1 to 1,000 $m^2/g$, preferably 5 to 600 $m^2/g$. High-purity spheres are preferable as the form of silica gel of the packings for the analytical column.

Using the chemical modifying agent represented by the general formula [I], the surface modification reaction of silica gel is performed usually at 60° to 200° C., preferably at 100° to 160° C., preferably in a liquid phase. Solvents can be ones which are not reacted with silica gel and the chemical modifying agent and are stable under the above-mentioned reaction temperature. Preferred solvents are aromatic hydrocarbons such as benzene, toluene, xylene and mesitylene and substituted aromatic compounds such as dichlorobenzene. Reaction pressure is usually atmospheric pressure, but the reaction can be performed under an autoclaved condition of 1.5 to 5.0 $kg/cm^2$. Reaction time is usually 0.5 to 20 hours, preferably 3 to 10 hours. It is preferable to add a basic compound such as pyridine or imidazole to reaction mixtures.

After the surface modification reaction, the reaction mixture can be used for the next reaction, i.e., endcapping reaction as it is, but the solid matter can be filtered out from the surface modification reaction mixture, washed, dried and used for the endcapping reaction.

The endcapping agent represented by the general formula [II] is bifunctional cyclic silazane, and exemplified by 1,1,3,3,5,5-hexamethylcyclotrisilazane, 1,1,3,3,5,5,7,7-octamethylcyclotetrasilazane, 1,1,3,3,5,5,7,7,9,9-decamethylcyclopentasilazane, 1,1,3,3,5,5,7,7,9,9,11,11-dodecamethylcyclohexasilazane, 1,1,3,3,5,5-hexaethylcyclotrisilazane, 1,1,3,3,5,5,7,7-octaethylcyclotetrasilazane, 1,1,3,3,5,5,7,7,9,9-decaethylcyclopentasilazane and 1,1,3,3,5,5,7,7,9,9,11,11-dodecaethylcyclohexasilazane. These can be used solely or in combination. The endcapping agent [II] can be used in combination with bifunctional silane represented by the general formula [III] (for example, dimethyldichlorosilane, dimethyldimethoxysilane and the like).

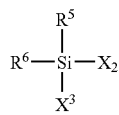

$$R^6-\underset{\underset{X^3}{|}}{\overset{\overset{R^5}{|}}{Si}}-X^2 \quad [III]$$

In the formula, $X^2$ and $X^3$, the same or different, are hydrogen, halogen or alkoxyl having one to four carbon atoms, and $R^5$ and $R^6$, the same or different, alkyl having one to four carbon atoms or aryl respectively.

The bifunctional cyclic silazane as the endcapping agent has advantages that it has more sites which can be reacted and is more active than monofunctional compounds such as trimethylchlorosilane and hexamethyldisilazane and causes less side reactions than trifunctional compounds such as methyltrichlorosilane. The bifunctional cyclic silazane has a boiling point which is higher than that of cyclic siloxane having similar structure by about 50° C. and is suitable for a liquid phase reaction. In a reaction using siloxane water is formed. On the other hand, in the liquid phase reaction using silazane, ammonia is shifted to a gas phase, which is advantageous for progress of the reaction, and unreacted silazane can be recovered and recycled.

An amount of the endcapping agent is usually 0.1 to 20, preferably 0.2 to 2 expressed in terms of a weight ratio of endcapping agent/surface-modified silica gel.

The endcapping agent itself can be used for the reaction as it is, but the agent can also be diluted with an organic solvent to cut production costs. Organic solvents to be used for dilution can be one's which are not reacted with the endcapping agent and are stable under the reaction temperature. Preferred solvents are aromatic hydrocarbons such as benzene, toluene, xylene and mesitylene and substituted aromatic compounds such as dichlorobenzene. A dilution ratio is usually 0.1 to 200, preferably 1 to 20 expressed in terms of a weight ratio of solvent/endcapping agent.

The endcapping reaction can be performed in a liquid or a gas phase. When the reaction is performed in a liquid phase, reaction equipment is simple, and a treatment amount per batch can be increased.

The reaction temperature of the endcapping reaction is preferably 100° to 200° C., more preferably 140° to 180° C. The higher the reaction temperature, the higher is an effect on promoting the endcapping reaction, but the greater is a cost of the equipment.

Though the endcapping reaction can be performed also at atmospheric pressure, it is preferable to perform the reaction under an autoclaved condition of 1.5 to 5.0 kg/cm². The pressure in the reaction can be lowered and a demand for pressure resistance of the reaction equipment can be moderated by using an organic solvent having a boiling point close to the reaction temperature.

The reaction time of the endcapping reaction is usually 0.5 to 20 hours, preferably 3 to 10 hours.

After the endcapping reaction, the unreacted endcapping agent can be recovered by solid-liquid separation and recycled. The separated solid is washed with methanol and dried to obtain the packing for liquid chromatography.

The present invention is practically described below by giving some Examples of the present invention. However, these Examples do not limit the scope of the present invention. As comparison, Examples wherein conventional endcapping agents were used are given. Comparative tests were performed with respect to typical commercial ODS columns, too.

EXAMPLE 1

Daisogel SP-100-5P (spherical high-purity silica gel, average particle diameter: 5 μm, pore diameter: 100 angstrom, surface area: 450 m²/g, 15 g) as silica gel was azeotropically dehydrated in toluene (200 ml), octadecyldimethylchlorosilane (4.7 g) as a chemical modifying agent (4.7 g) and pyridine (1.3 g) were added thereto, and the resulting mixture was heated and refluxed for five hours. Then the reaction mixture was cooled and filtered, and the obtained solid was washed with methanol several times and dried to give 19 g of-surface-modified silica gel.

The obtained surface-modified silica gel (19 g), 1,1,3,3,5,5-hexamethylcyclotrisilazane (20 g) as an endcapping agent and xylene (200 g) were placed in an autoclave, and the endcapping reaction was performed in a liquid phase at a temperature of 160° C. and at pressure of 1.5 to 3.0 kg/cm² for five hours. Then the reaction mixture was cooled and filtered, and the obtained solid was washed with methanol several times and dried to give 20 g of a packing for liquid chromatography.

EXAMPLE 2

The same procedure as in Example 1 was repeated except that octadecylmethyldichlorosilane (5.0 g) was used as the chemical modifying agent, and the amount of pyridine was changed into 2.6 g to give 20 g of a packing for liquid chromatography.

EXAMPLE 3

The same procedure as in Example 1 was repeated except that octadecyltrichlorosilane (5.0 g) was used as the chemical modifying agent, and the amount of pyridine was changed into 3.9 g to give 20 g of a packing for liquid chromatography.

COMPARATIVE EXAMPLE 1

The surface-modified silica gel (19 g) obtained by the same operation using the same chemical modifying agent as in Example 1 and trimethylchlorosilane (20 g) as an endcapping agent were added to toluene (200 g), the endcapping reaction was performed in a liquid phase at a temperature of 110° C. and at atmospheric pressure for five hours. Then the obtained reaction mixture was treated according to the same manner as in Example 1 to give 20 g of a packing for liquid chromatography.

COMPARATIVE EXAMPLE 2

The surface-modified silica gel (19 g) obtained by the same operation using the same chemical modifying agent as in Example 1, hexamethyldisilazane (20 g) and toluene (200 g) were placed in an autoclave, the endcapping reaction was performed in a liquid phase at a temperature of 140° C. and at pressure of 1.5 to 3.0 kg/cm² for five hours. Then the obtained reaction mixture was treated according to the same manner as in Example 1 to give 20 g of a packing for liquid chromatography.

COMPARATIVE EXAMPLE 3

An ODS column I (inner diameter: 4.6 mm, length: 150 mm) produced by G was applied for evaluation tests.

COMPARATIVE EXAMPLE 4

An ODS column P (inner diameter: 4.6 mm, length: 150 mm) produced by Y was applied for evaluation tests.

COMPARATIVE EXAMPLE 5

An ODS column M (inner diameter: 4.6 mm, length: 150 mm) produced by N was applied for evaluation tests.

COMPARATIVE EXAMPLE 6

An ODS column C (inner diameter: 4.6 mm, length: 150 mm) produced by S was applied for evaluation tests.

Evaluation Tests

1) Determination of Silanol Group Residue Amount

NMR measurement of Si species was performed for packings for liquid chromatography obtained in Examples and Comparative Examples, namely endcapped silica gel, using high resolution 500 MHz $^{29}$Si solid-state NMR ("Jeol ECP-500" produced by Japan Electron Optics Laboratory Co., Ltd.) by a single pulse magic angle spinning method under the following conditions, and the amount of silanol group residue was calculated by the following equation from the obtained NMR spectra.

Amount of silanol group residue=$[Q^3/(Q^3+Q^4)]\times 100\%$ $Q^3$: An integral value of a peak belonging to a Si species having a silanol group at around −100 ppm $Q^4$ An integral value of a peak belonging to a Si species having no silanol group at around −110 ppm Of course, it is better that the amount of the silanol group residue is small, preferably 5% or lower.

$^{29}$Si-NMR Measurement Conditions

Rotation frequency: 5,000 Hz
Field strength: 11.7 T
Resonance frequency: 99.36 MHz
Pulse length:2.8 µs
Relaxation delay: 25 s
Scan times: 2,500

FIGS. 1, 3, 5, 7 and 9 show $^{29}$Si-NMR charts of the packings for liquid chromatography of Examples 1 to 3 and Comparative Example 1 and 2 respectively. These charts (FIGS. 1, 3, 5) show that the residual silanol group (peak at around −100 ppm ($Q^3$)) of Examples 1 to 3 was not detected.

Table 2 shows the amount of silanol group residue determined for the packings for liquid chromatography obtained in Examples 1 to 3 and Comparative Examples 1 and 2. Table 2 shows that the amount of silanol group residue was 0% in the packings for liquid chromatography of Examples 1 to 3, and these results were favorable. The amount of silanol group residue was large in the packings for liquid chromatography of Comparative Examples 1 and 2, and these results were unfavorable.

2) Liquid Chromatography Evaluation

A stainless steel column (inner diameter: 4.6 mm, length: 150 mm) was packed with each packing for liquid chromatography obtained in Examples and Comparative Examples, and liquid chromatography evaluation tests were performed using amitriptyline as a standard sample. Amitriptyline is a strongly basic compound (pKa=9.4) having an anti depressant action and is a typical compound which causes tailing badly in liquid chromatography and is difficult to analyze. The liquid chromatography evaluation tests were performed under the following operation conditions using a buffer which is the aptest to be affected by the residual silanol group (pH: 7.0, temperature: 20° C.) to prepare a mobile phase. FIGS. 2, 4, 6, 8, 10, 11, 12, 13 and 14 show liquid chromatography charts of amitriptyline using the packings for liquid chromatography of Examples 1 to 3 and Comparative Examples 1 to 6 respectively.

Asymmetric factors (As) were calculated by the following equation on the basis of 10% peak height for the packings for liquid chromatography of Examples 1 to 3 and Comparative Examples 1 to 6. The obtained values are shown in Tables 2 and 3. The asymmetric factor is preferably 3.0 or less, ideally 1.0, the lower the value, the better is symmetry of the peak, and the less is tailing. These Tables show that the asymmetric factors were 3.0 or less for the packings for liquid chromatography of Examples 1 to 3, and these results were favorable. The asymmetric factors were far higher than 3.0 for the packings for liquid chromatography of Comparative Examples 1 to 6, and these results were unfavorable.

$As=b/a$ a: The peak width of the front half of a peak at 10% peak height b: The peak width of the latter half of a peak at 10% peak height Operation Conditions of Liquid Chromatography Mobile phase: 20 mM $K_2HPO_4$—$KH_2PO_4$ buffer (pH=7.0)/methanol= 35/65 (volume ratio)
Flow rate: 1.4 ml/min.
Column temperature: 20° C.,
Detector: UV 240 nm
Sample: Amitriptyline (0.75 mg/ml, 10 µl)

TABLE 2

|  | Chemical modifying agent | Endcapping agent | Silanol group residue (%) | Asymmetric factor (As) |
|---|---|---|---|---|
| Example 1 | Octadecyldimethylchlorosilane | 1,1,3,3,5,5-Hexamethylcyclotrisilazane | 0 | 1.7 |
| Example 2 | Octadecylmethyldichlorosilane | 1,1,3,3,5,5-Hexamethylcyclotrisilazane | 0 | 2.5 |
| Example 3 | Octadecyltrichlorosilane | 1,1,3,3,5,5-Hexamethylcyclotrisilazane | 0 | 2.9 |
| Comparative Example 1 | Octadecyldimethylchlorosilane | Trimethylchlorosilane | 13.1 | 6.2 |
| Comparative Example 2 | Octadecyldimethylchlorosilane | Hexamethyldisilazane | 12.2 | 5.6 |

TABLE 3

| | Commercially available column | Asymmetric factor (As) |
|---|---|---|
| Comparative Example 3 | ODS column I produced by G | 4.9 |
| Comparative Example 4 | ODS column P produced by Y | 7.4 |
| Comparative Example 5 | ODS column M produced by N | 7.4 |
| Comparative Example 6 | ODS column C produced by S | 4.2 |

According to the present invention, the packings for high performance liquid chromatography can be prepared at relatively mild temperatures of 200° C. or lower, accordingly with relatively simple reaction equipment and low costs.

The packings for liquid chromatography according to the present invention are high-performance packings which have very small amount of silanol group residue (the amount of silanol group residue determined by $^{29}$Si solid-state NMR is preferably 5% or less), prevent remarkably tailing of the basic compounds and improve drastically symmetry of the peaks. Accordingly, the packings are particularly suitable for reversed phase liquid chromatography and are useful for analysis and preparative separation of the basic compounds.

What is claimed is:

1. A process for preparing a packing for liquid chromatography characterized in that an endcapping agent represented by the following general formula [II] is reacted in a liquid phase or a gas phase with silica gel which is surface-modified with a chemical modifying agent to link the endcapping agent to a residual silanol group on the silica gel surface,

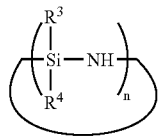

[II]

wherein $R^3$ and $R^4$, the same or different, are alkyl having one to four carbon atoms, and n is the factor of structural unit and an integer of 2 to 10.

2. A process for preparing a packing for liquid chromatography characterized in that an endcapping agent represented by the following general formula [II] is reacted in a liquid phase or a gas phase with silica gel which is surface-modified with alkylsilane represented by the following general formula [I] to link the endcapping agent to a residual silanol group on the silica gel surface,

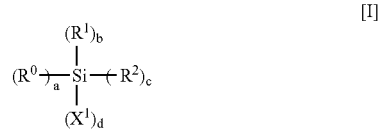

[I]

wherein $X^1$ is hydrogen, halogen or alkoxyl having one to four carbon atoms, $R^0$, $R^1$ and $R^2$, the same or different, are alkyl or aryl, "a" is the factor of $R^0$ and an integer of 0 to 3, "b" is the factor of $R^1$ and an integer of 0 to 3, "c" is the factor of $R^2$ and an integer of 0 to 3, and "d" is the factor of $X^1$ and an integer of 1 to 3, and these have a relation: a+b+c+d=4,

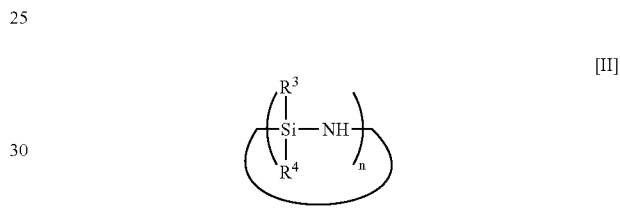

[II]

wherein $R^3$ and $R^4$, the same or different, are alkyl having one to four carbon atoms, and n is the factor of structural unit and an integer of 2 to 10.

3. The process for preparing the packing for liquid chromatography as claimed in claim 2, wherein the alkyl as $R^0$, $R^1$ and $R^2$ of the general formula [I] has aryl, amino or cyano at its terminal portion or has amide, carbamate, carbamide, ester or carbonate at its non-terminal portion.

* * * * *